United States Patent
Nealon

(10) Patent No.: US 7,573,869 B2
(45) Date of Patent: Aug. 11, 2009

(54) USE OF A SINGLE BROADBAND SS7 SIGNALING GATEWAY FOR MULTIPLE WIRELESS ACCESS GATEWAYS

(75) Inventor: Robert J. Nealon, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 850 days.

(21) Appl. No.: 10/666,684

(22) Filed: Sep. 18, 2003

(65) Prior Publication Data

US 2005/0064907 A1  Mar. 24, 2005

(51) Int. Cl.
*H04Q 11/00* (2006.01)
(52) U.S. Cl. .................. 370/385; 370/358; 370/401; 370/467
(58) Field of Classification Search ......... 370/352–356, 370/377, 384–386, 395.2, 395.5, 395.64, 370/401, 410, 422, 426, 467
See application file for complete search history.

(56) References Cited

U.S. PATENT DOCUMENTS 6,496,508 B1 * 12/2002 Breuckheimer et al. ..... 370/397
6,657,975 B1 * 12/2003 Baxley et al. ............... 370/260
6,952,433 B1 * 10/2005 Stumpert et al. ............ 370/524
7,065,093 B1 *  6/2006 Kumar et al. ............... 370/401
2001/0017861 A1 *  8/2001 Allen et al. ................. 370/399
2002/0105969 A1 *  8/2002 Benedyk et al. ............. 370/466

FOREIGN PATENT DOCUMENTS

EP           1109364 A2 *  6/2001
WO      WO 9823055 A1 *  5/1998

OTHER PUBLICATIONS

Rajasekar, S.N. et al., "Signaling Networks in Broadband-ISDN Environments," Conference Proceeding of the IEEE International Performance, Computing, and Communications Conference, 2000. IPCCC'00. Feb. 20-22, 2000, pp. 323-329.*

* cited by examiner

*Primary Examiner*—Donald L Mills
*Assistant Examiner*—Chi H Pham

(57) ABSTRACT

A method and system provide for using a single broadband SS7 signaling gateway for multiple wireless access gateways. One embodiment may have the steps of: forming a cluster of media gateways, each of the media gateways having a respective transcoder; providing at least one first media gateway of the cluster of media gateways having an integrated broadband SS7 signaling gateway, at least one second media gateway of the cluster of media gateways being without an integrated broadband SS7 signaling gateway; and using the at least one first media gateway for SS7 signaling and using the at least one second gateway for resources other than SS7 signaling.

18 Claims, 5 Drawing Sheets

USE OF A SINGLE BROADBAND SS7 SIGNALING GATEWAY FOR MULTIPLE WIRELESS ACCESS GATEWAYS

TECHNICAL FIELD

The present invention relates to wireless telephony in general, and, more particularly, to embodiments of a method and system for using a single broadband SS7 signaling gateway for multiple wireless access gateways.

BACKGROUND OF THE INVENTION

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT (now ITU-T), namely AAL1, AAL2, AAL3/4 and AAL5. In general, the layer services provided by AAL1 are constant bit rate (CBR) services, which require information to be transferred between source and destination at a constant bit rate. AAL2 offers a transfer of information with a variable bit rate. In addition, timing information is transferred between source and destination. Since the source is generating a variable bit rate, it is possible that cells are not completely filled and that filling level varies from cell to cell. AAL3/4 is used for transfer of data, which is sensitive to loss, but not sensitive to delay. The AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the common part of the convergence sublayer (CPCS).

The AAL2 signaling protocol describes methods by which a switched AAL2 connection can be established between two AAL2 end users across a network that consists of both ATM and AAL2 switches. The important function of AAL2 signaling protocol is to establish an AAL2 connection between two AAL2 end points on a concatenation of ATM Virtual Channel Connections (VCCs) that are either on-demand virtual circuit (SVC—switched virtual circuit) or semi-permanent virtual circuit (PVC—permanent virtual circuit). Some the basic requirements of AAL2 signaling protocol include the ability to establish an AAL2 connection between AAL2 end systems that support AESA (ATM End System Address) formats, the ability to support hop-by-hop routing mechanism between AAL2 end systems, the ability to indicate any failures to corresponding management entity, and the ability to setup AAL2 connections with different QoS requirements.

In AAL2, packets (minicells) from many users are assembled into a single ATM cell and transmitted on the same ATM connection. In addition, packets are allowed to straddle across ATM cell boundary to maximize the bandwidth utilization.

Historically, the control signaling, for the setup of an AAL2 point-to-point connection for the establishment of a new call, all terminated at a single media gateway. In prior art media gateways it is not possible to individually terminate the bearer control signaling without having individual signaling facilities on each gateway. Each media gateway must have its own broadband SS7 signaling gateway used only for that media gateway. Only the resources of a single media gateway are available for a particular call.

Thus, there is a need for systems with greater signaling capacity and efficiency than is currently available in the field of media gateways.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms one embodiment of the present method is for using a single broadband SS7 signaling gateway for multiple wireless access gateways. This embodiment may have the steps of: forming a cluster of media gateways, each of the media gateways having a respective transcoder; providing at least one first media gateway of the cluster of media gateways having an integrated broadband SS7 signaling gateway, at least one second media gateway of the cluster of media gateways being without an integrated broadband SS7 signaling gateway; and using the at least one first media gateway for SS7 signaling and using the at least one second gateway for resources other than SS7 signaling.

In general terms one embodiment of the present system is for distribution of control signaling related to the establishment, release and maintenance of AAL2 point-to-point connections across a series of ATM VCCs that carry AAL2 links. This embodiment may have: a cluster of media gateways, each of the media gateways having a respective transcoder; at least one first media gateway of the cluster of media gateways having an integrated broadband SS7 signaling gateway; at least one second media gateway of the cluster of media gateways being without an integrated broadband SS7 signaling gateway; and the at least one first media gateway having a function for SS7 signaling and the at least one second gateway having at least one function for a resource other than SS7 signaling.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

A general embodiment of the present method provides for distribution of control signaling related to the establishment, release and maintenance of AAL2 point-to-point connections across a series of ATM VCCs that carry AAL2 links. It allows for the concentration of signaling resources within a single media gateway by relieving the need for all media gateways to have an integrated broadband SS7 signaling gateway.

Thus, embodiments of the present system and method allow a single media gateway with an integrated broadband SS7 signaling gateway to be used as a single SS7 point code for more than one gateway of the cluster of media gateways. This allows for greater signaling efficiency and greater capacity. Also, all resources of all media gateways in a "cluster" are available for a particular call.

In general, embodiments of the present system and method provides for distribution of control signaling related to the establishment, release and maintenance of AAL2 point-to-point connections across a series of ATM VCCs that carry AAL2 links. This allows for the concentration of signaling resources within a single media gateway by relieving the need for all media gateways to have an integrated broadband SS7 signaling gateway.

All media gateway have resources (e.g. transcoders) that are used for calls. Embodiments of the present system and method establish a group of media gateways into a "cluster" that allows all the transcoders in that "cluster" to be available for a particular call.

Using the ITU Q.2630.1 standard as reference, the AAL type 2 signaling protocol provides the signaling capability to establish, release and maintain AAL type 2 point-to-point connections across a series of ATNI VCCs that carry AAL type 2 links. The signaling protocol is defined as a set of at least three entities: protocol entity, nodal function, served user.

Figure 1:
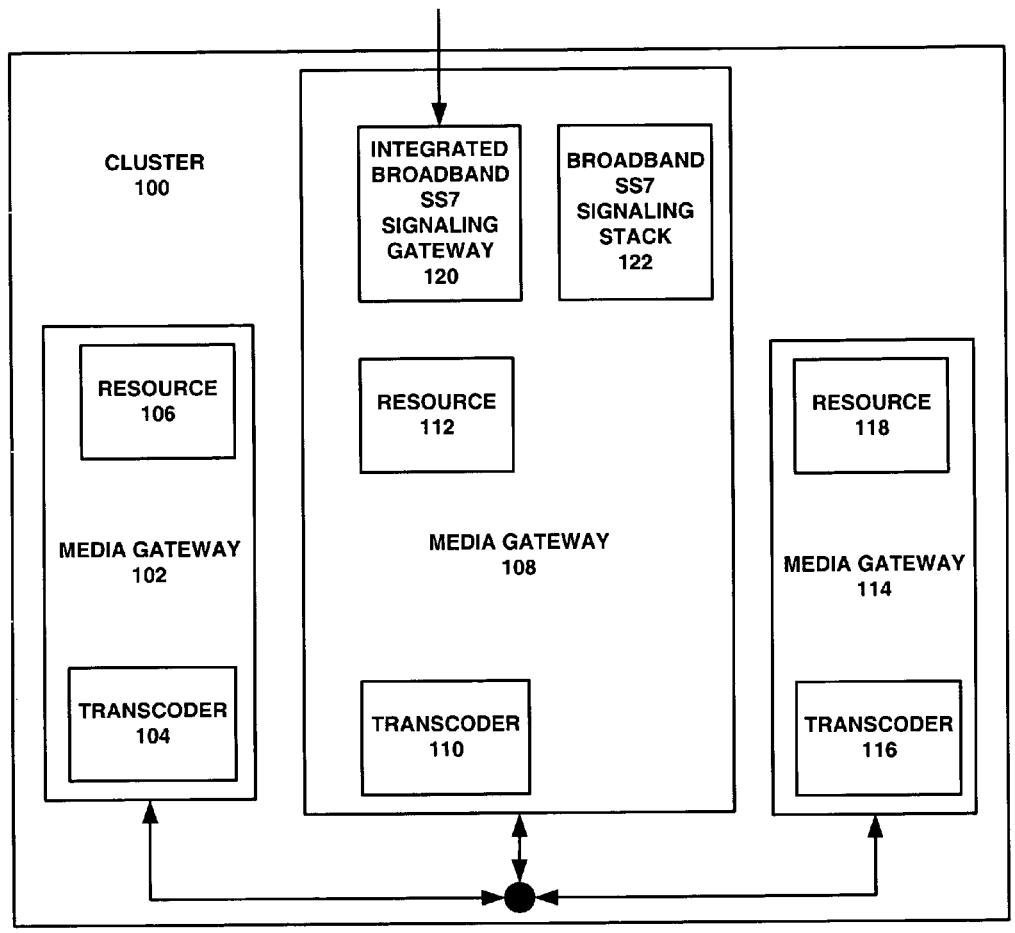
FIG. 1 depicts a block diagram illustrative of one embodiment of the present system.

One example of an embodiment of the present method and system is depicted in FIG. 1. In general terms this embodiment of the present system is for distribution of control signaling related to establishment, release and maintenance of AAL2 point-to-point connections across a series of ATM VCCs that carry AAL2 links. This embodiment may have: a cluster 100 of media gateways 102, 108, 114, each of the media gateways 102, 108, 114 having a respective transcoder 104, 110, 116; at least one first media gateway 108 of the cluster of media gateways having an integrated broadband SS7 signaling gateway 120; at least one second media gateway 102, 114 of the cluster of media gateways being without an integrated broadband SS7 signaling gateway; and the at least one first media gateway 108 having a function for SS7 signaling and the at least one second gateway having at least one function for a resource other than SS7 signaling.

In this example the A2SU-SAP interface is defined as being between the nodal function and the served user. This provides a reliable communications framework that allows the A2SU-SAP interface to be inter-processor/inter-media gateway. Also in this embodiment a single broadband SS7 signaling stack 122 may serve as the AAL2 signaling entity to the multiple AAL type 2 service endpoints acting as AAL2 served users. An individual AAL2 service endpoint is assigned to each media gateway. The call control entity is then allowed to choose resources from the set of all media gateways within a single "cluster".

Another embodiment of present system may have a configuration in which the first media gateway has an integrated broadband SS7 signaling gateway as a single SS7 point code for more than one gateway of the cluster of media gateways. In another embodiment a single broadband SS7 signaling stack is the AAL2 signaling entity to the multiple AAL2 service endpoints acting as AAL2 served users.

Figure 2:
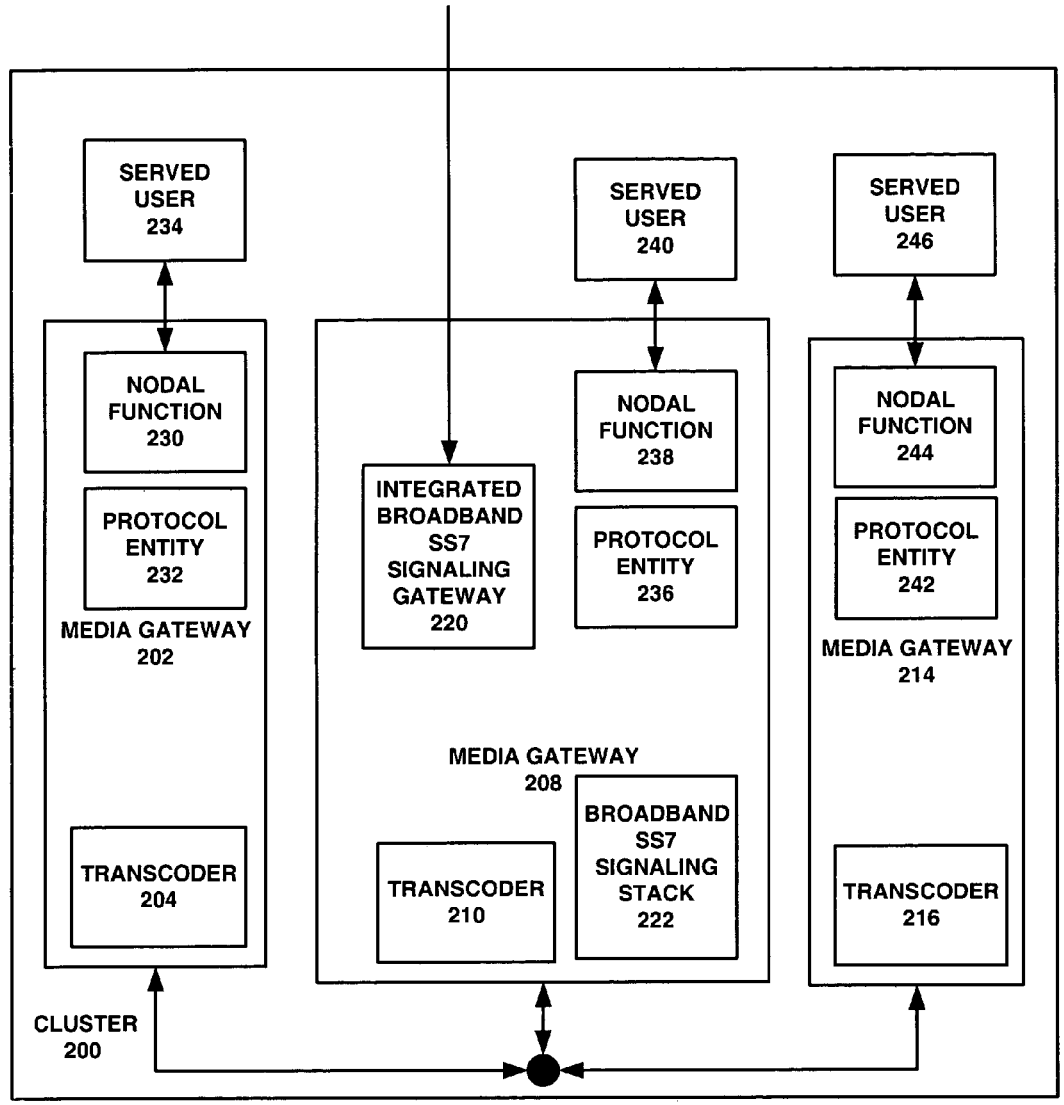
FIG. 2 depicts another block diagram illustrative of another embodiment of the present system.

Another embodiment of the present system is depicted in FIG. 2 and may have a cluster 200 of media gateway units 202, 208, 214, each of the media gateway units having a respective transcoder 204, 210, 216, a signaling protocol having at least a protocol entity 232, 236, 242, a nodal function, 230, 238, 244, and a served user 234, 240, 246. A respective A2SU-SAP interface 250, 252, 254 may be operatively connected between the nodal function 230, 238, 244, and the served user 234, 240, 246, for each of media gateway units, 202, 208, 214. At least one first media gateway unit 208 of the cluster of media gateway units has an integrated broadband SS7 signaling gateway 220. At least one second media gateway unit 202, 214 of the cluster of media gateway units does not have an integrated broadband SS7 signaling gateway. The at least one first media gateway unit 208 has a function for SS7 signaling (broadband SS7 signaling stack 222) and the at least one second gateway unit 202, 214 has at least one function for a resource other than SS7 signaling.

Figure 3:
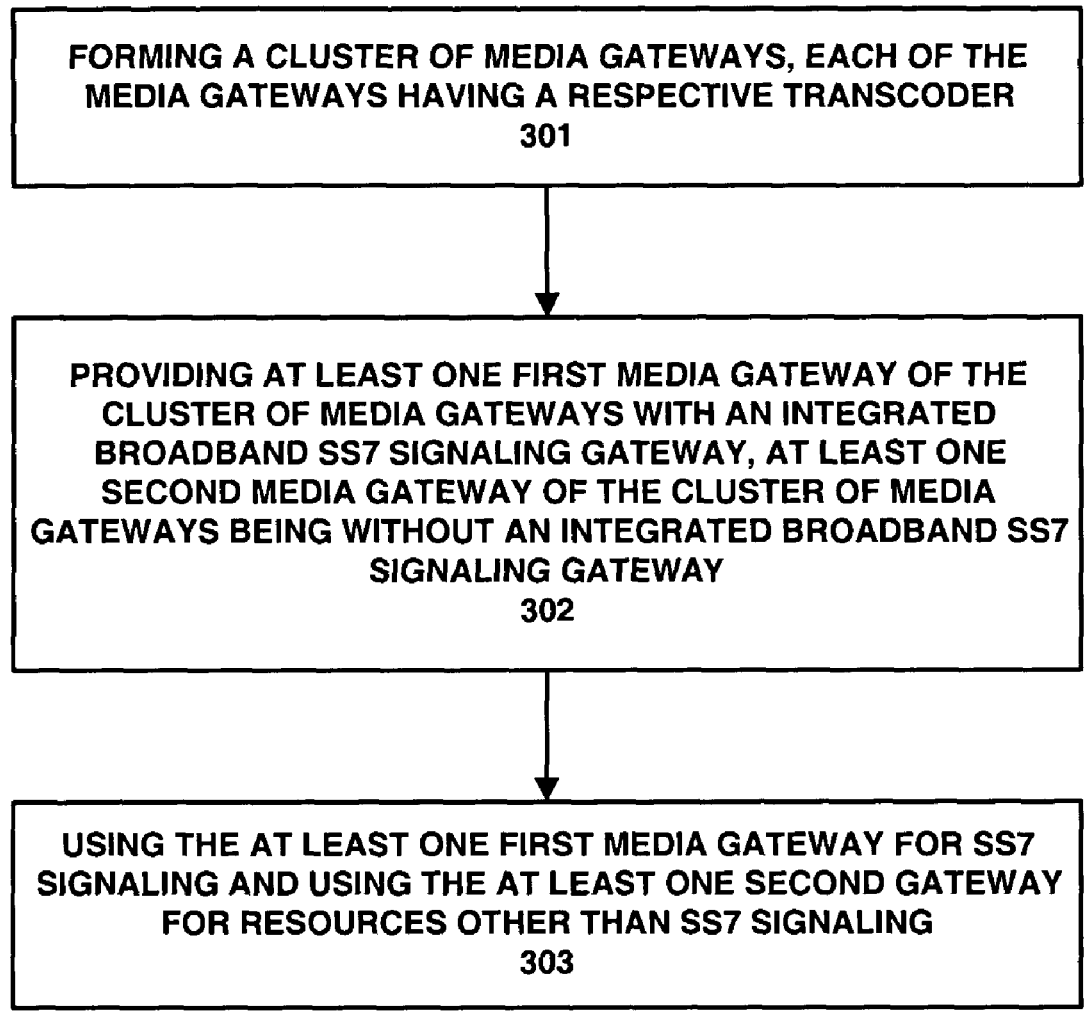
FIG. 3 illustrates a very general flow chart of logical operational steps that may be followed in accordance with one embodiment of the present method.

FIG. 3 depicts an embodiment of the present method for using a single broadband SS7 signaling gateway for multiple wireless access gateways. This embodiment may have the steps of: forming a cluster of media gateways, each of the media gateways having a respective transcoder (step 301); providing at least one first media gateway of the cluster of media gateways having an integrated broadband SS7 signaling gateway, at least one second media gateway of the cluster of media gateways being without an integrated broadband SS7 signaling gateway (step 302); and using the at least one first media gateway for SS7 signaling and using the at least one second gateway for resources other than SS7 signaling (step 303).

The distributing control signaling may be for establishment, release and maintenance of AAL2 point-to-point connections across a series of ATM VCCs that carry AAL2 links. In one embodiment a single media gateway with an integrated broadband SS7 signaling gateway may be a single SS7 point code for more than one gateway of the cluster of media gateways. That is, the method may further include using a single broadband SS7 signaling stack as the AAL2 signaling entity to the multiple AAL2 service endpoints acting as AAL2 served users.

The present method in a further embodiment may include using an AAL2 signaling protocol that provides the signaling capability to establish, release and maintain AAL2 point-to-point connections across a series of ATNI VCCs that carry AAL2 links. The signaling protocol may be defined as a set of at least three entities including a protocol entity, a nodal function, and a served user.

Figure 4:
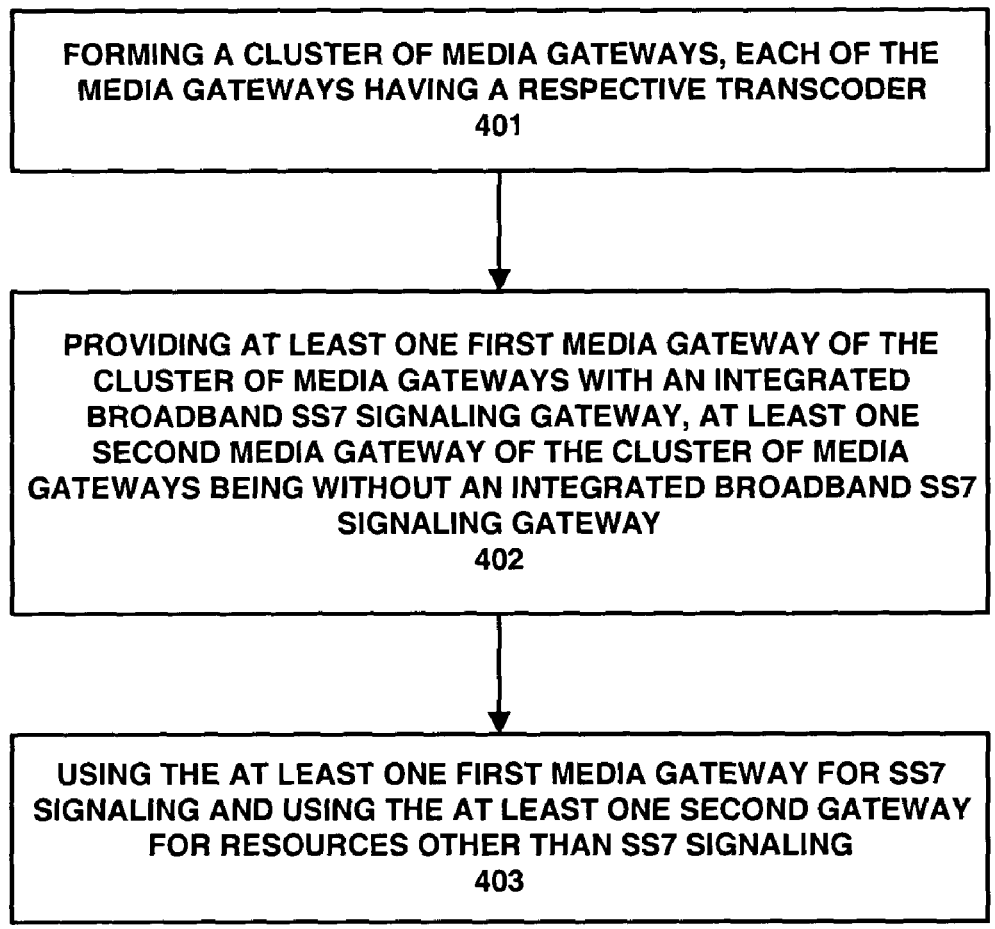
FIG. 4 illustrates another flow chart of logical operational steps that may be followed in accordance with another embodiment of the present method.

FIG. 4 depicts another embodiment of the present method for distribution of control signaling related to the establishment, release and maintenance of AAL2 point-to-point connections across a series of ATM VCCs that carry AAL2 links, the method may have the steps of: forming a cluster of media gateways, each of the media gateways having a respective transcoder (step 401); providing at least one first media gateway of the cluster of media gateways having an integrated broadband SS7 signaling gateway, at least one second media gateway of the cluster of media gateways being without an integrated broadband SS7 signaling gateway (step 402); and using the at least one first media gateway for SS7 signaling and using the at least one second gateway for resources other than SS7 signaling (403).

Figure 5:
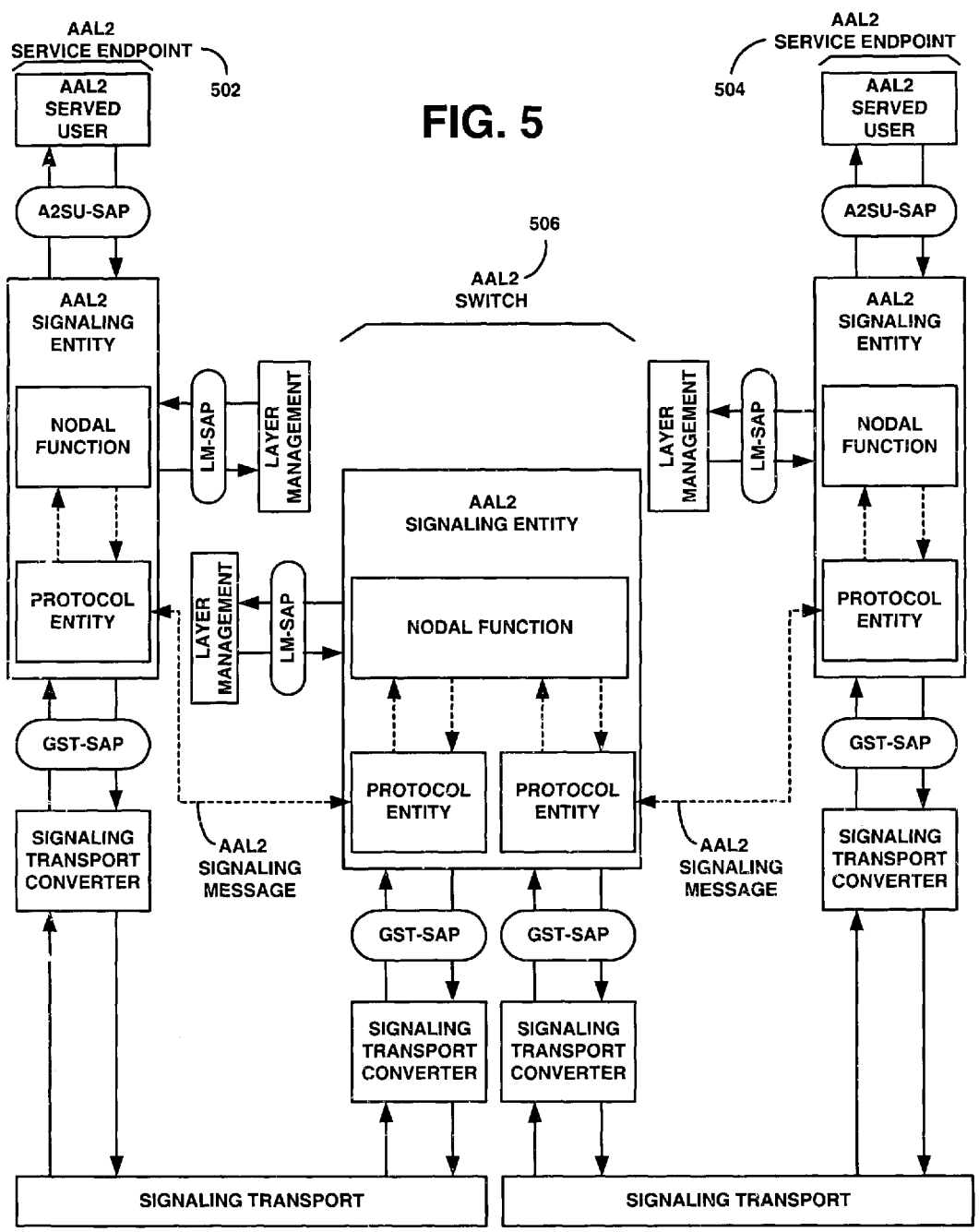
FIG. 5 depicts a more detailed block diagram illustrative of an embodiment of the present system.

Another embodiment of the present system is depicted in FIG. 5. In this embodiment AAL2 service endpoints 502, and 504 are operatively connected to one another via an AAL2 switch 506. See the above description for operation of the elements depicted in FIG. 5.

Some differences of the present method and system over the prior art are as follows. By using multiple processors, greater signaling capacity may be obtained. The AAL type 2 Service Endpoint is allowed, as well as, permitting the service endpoint to be remote from the physical layers of the SS7 stack. Concentration of SS7 signaling resources is also allowed within one media gateway resulting in efficient use of the broadband SS7 stacks. This means that the other media gateways do not have to devote resources to SS7 signaling, resulting in a higher capacity overall for the systems. Also, the resources of all media gateways within a "cluster" are available for a particular call.

Embodiments of the present method and system allow a single media gateway with an integrated broadband SS7 signaling gateway to be used as a single SS7 point code for more than one gateway of the cluster of media gateways. This allows for greater signaling efficiency and greater capacity and overcomes the need in the prior art for improved gateways.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, the wireless access gateway may be utilized in UMTS, GSM, and CDMA systems. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

I claim:

1. A method for using a single broadband SS7 signaling gateway for multiple wireless access gateways, comprising the steps of:
    forming a cluster of media gateways, each of the media gateways having a respective transcoder;
    providing at least one first media gateway of the cluster of media gateways having an integrated broadband SS7 signaling gateway, at least one second media gateway of the cluster of media gateways being without an integrated broadband SS7 signaling gateway; and
    using the at least one first media gateway for SS7 signaling and using the at least one second gateway for resources other than SS7 signaling; and
    using the at least one single media gateway with an integrated broadband SS7 signaling gateway as a single SS7 point code for more than one gateway of the cluster of media gateways whereby all resources of all media gateways in the cluster are available for a particular call;
    wherein a single broadband SS7 signaling gateway is used for multiple wireless access gateways, and wherein a call control entity is allowed to choose resources from all media gateways in the cluster of media gateways.

2. The method according to claim 1, wherein the method further comprises of distributing control signaling related to the establishment, release and maintenance of AAL2 point-to-point connections across a series of ATM VCCs that carry AAL2 links.

3. The method according to claim 1, wherein the method further comprises of using a single broadband SS7 signaling stack as the AAL2 signaling entity to the multiple AAL2 service endpoints acting as AAL2 served users.

4. The method according to claim 1, wherein the method further comprises of using an AAL2 signaling protocol that provides the signaling capability to establish, release and maintain AAL2 point-to-point connections across a series of ATM VCCs that carry AAL2 links.

5. The method according to claim 4, wherein the method further comprises of the signaling protocol is defined as a set of at least three entities including a protocol entity, a nodal function and a served user, and wherein, a respective interface is operatively connected between the nodal function and the served user for each of the media gateways, and wherein the first gateway contains the nodal functions and each of the media gateway contain a served user.

6. A method for distribution of control signaling related to the establishment, release and maintenance of AAL2 point-to-point connections across a series of ATM VCCs that carry AAL2 links, comprising the steps of:
    forming a cluster of media gateways, each of the media gateways having a respective transcoder;
    providing at least one first media gateway of the cluster of media gateways having an integrated broadband SS7 signaling gateway, at least one second media gateway of the cluster of media gateways being without an integrated broadband SS7 signaling gateway; and
    using the at least one first media gateway for SS7 signaling and using the at least one second gateway for resources other than SS7 signaling; and
    using a single media gateway with an integrated broadband SS7 signaling gateway as a single SS7 point code for more than one gateway of the cluster of media gateways whereby all resources of all media gateways in the cluster are available for a particular call;
    wherein a single broadband SS7 signaling gateway is used for multiple wireless access gateways, and wherein a call control entity is allowed to choose resources from all media gateways in the cluster of media gateways.

7. The method according to claim 6, wherein the method further comprises of using a single media gateway with an integrated broadband SS7 signaling gateway as a single SS7 point code for more than one gateway of the cluster of media gateways.

8. The method according to claim 6, wherein the method further comprises of using a single broadband SS7 signaling stack as the AAL2 signaling entity to the multiple AAL2 service endpoints acting as AAL2 served users.

9. The method according to claim 6, wherein the method further comprises of using an AAL2 signaling protocol that provides the signaling capability to establish, release and maintain AAL2 point-to-point connections across a series of ATM VCCs that carry AAL2 links.

10. The method according to claim 9, wherein the signaling protocol is defined as a set of at least three entities including a protocol entity, a nodal function, and a served user, and wherein, a respective interface is operatively connected between the nodal function and the served user for each of the media gateways, and wherein the first gateway contains the nodal functions and each of the media gateway contain a served user.

11. A system for distribution of control signaling related to the establishment, release and maintenance of AAL2 point-to-point connections across a series of ATM VCCs that carry AAL2 links, comprising:
   a cluster of media gateways, each of the media gateways having a respective transcoder;
   at least one first media gateway of the cluster of media gateways having an integrated broadband SS7 signaling gateway;
   at least one second media gateway of the cluster of media gateways being without an integrated broadband SS7 signaling gateway; and
   the at least one first media gateway having a function for SS7 signaling and the at least one second gateway having at least one function for a resource other than SS7 signaling; and
   wherein a single media gateway with an integrated broadband SS7 signaling gateway is used as a single SS7 point code for more than one gateway of the cluster of media gateways whereby all resources of all media gateways in the cluster are available for a particular call;
   wherein a single broadband SS7 signaling gateway is used for multiple wireless access gateways, and wherein a call control entity is allowed to choose resources from all media gateways in the cluster of media gateways.

12. The system according to claim 11, wherein the system further comprises of the first media gateway has an integrated broadband SS7 signaling gateway as a single SS7 point code for more than one gateway of the cluster of media gateways.

13. The system according to claim 11, wherein a single broadband SS7 signaling stack is the AAL2 signaling entity to the multiple AAL2 service endpoints acting as AAL2 served users.

14. The system according to claim 11, wherein the system further comprises of an AAL2 signaling protocol that provides the signaling capability to establish, release and maintain AAL2 point-to-point connections across a series of ATM VCCs that carry AAL2 links.

15. A system for distribution of control signaling related to the establishment, release and maintenance of AAL2 point-to-point connections across a series of ATM VCCs that carry AAL2 links, comprising:
   a cluster of media gateway units, each of the media gateway units having a respective transcoder, a signaling protocol having at least a protocol entity, a nodal function, and a served user;
   a respective interface operatively connected between the nodal function on the first gateway and the served user for each of media gateway units;
   at least one first media gateway unit of the cluster of media gateway units having an integrated broadband SS7 signaling gateway;
   at least one second media gateway unit of the cluster of media gateway units being without an integrated broadband SS7 signaling gateway; and
   the at least one first media gateway unit having a function for SS7 signaling and the at least one second gateway unit having at least one function for a resource other than SS7 signaling; and
   wherein a single media gateway with an integrated broadband SS7 signaling gateway is used as a single SS7 point code for more than one gateway of the cluster of media gateways;
   wherein a single broadband SS7 signaling gateway is used for multiple wireless access gateways, and wherein a call control entity is allowed to choose resources from all media gateways in the cluster of media gateways.

16. the system according to claim 15, wherein the function for SS7 signaling is a broadband SS7 signaling stack, and wherein the single broadband SS7 signaling stack is the AAL2 signaling entity to the multiple AAL2 service endpoints acting as AAL2 served users.

17. The system according to claim 15, wherein the first media gateway unit having an integrated broadband SS7 signaling gateway is a single SS7 point code for more than one gateway unit of the cluster of media gateway units.

18. The system according to claim 15, wherein each of the media gateway units is an AAL2 service endpoint.

\* \* \* \* \*

UNITED STATES PATENT AND TRADEMARK OFFICE
CERTIFICATE OF CORRECTION

PATENT NO. : 7,573,869 B2  Page 1 of 1
APPLICATION NO. : 10/666684
DATED : August 11, 2009
INVENTOR(S) : Robert J. Nealon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Seventh Day of September, 2010

David J. Kappos
*Director of the United States Patent and Trademark Office*